3,068,107
DIELECTRIC CERAMIC COMPOSITION
Solomon Levinson, Stamford, Conn., assignor to Vitramon, Incorporated, Monroe, Conn., a corporation of Delaware
No Drawing. Filed Apr. 17, 1961, Ser. No. 103,191
5 Claims. (Cl. 106—39)

The present invention relates to barium titanate ceramic compositions having a high dielectric constant which shows very little variation over an extended temperature range and having an exceptionally high dielectric strength.

It is known to prepare barium titanate ceramics which have dielectric constants in the order of 2000 or above but such ceramics generally show a high degradation in the value of the dielectric constant as the temperature of the ceramic is varied over a temperature range of —55° C. to 150° C. This change in the dielectric constant with temperature renders these known ceramics inferior for the preparation of electrical components which are to be employed under alternating conditions of extreme heat and cold.

Likewise prior known barium titanate ceramics have a relatively low dielectric strength in the order of about 450 volts per mil thickness, thereby limiting their use to lesser voltage applications or greater thicknesses.

Another disadvantage encountered with known barium titanate ceramics stems from the fact that electrical components such as capacitors prepared therefrom have been found to have a relatively short life or period of reliable performance in that the dielectric constants of such ceramics decrease very rapidly during use.

It is an object of the present invention to prepare barium titanate ceramic compositions which in their cast and fired state have a high dielectric constant which resists degradation and is relatively stable over an extended temperature range.

It is another object of this invention to prepare barium titanate ceramic compositions which in their cast and fired state have exceptionally high dielectric strengths and voltage breakdown strengths of at least 750 volts per mil and higher.

It is another object of this invention to produce barium titanate ceramic compositions which in their cast and fired state have a long life or extended period of reliable performance.

These and other objects and advantages are accomplished according to the present invention as described herein.

The ceramic compositions of the present invention comprise barium titanate in major proportion together with minor amounts of bismuth stannate, tin oxide and calcium titanate.

The bismuth stannate in the above formulations functions as a peak suppressor and renders the dielectric constant of the formed ceramic body relatively stable over a temperature range of from about —55° C. to about 150° C. The tin oxide functions to provide a formed ceramic body which is flat, smooth and unrippled and has no tendency to curl or warp. These properties are particularly important and noticeable when higher bismuth stannate concentrations are used.

The calcium salt present in the above composition has been found to increase the effective life of the barium titanate ceramic and aid in producing a high dielectric strength material.

The proportions of the above ingredients have been found to be critical to the obtaining of ceramics having the properties specified. In general it has been found that the barium titanate must be present in an amount equal to from about 85 to about 96 mole percent of the total composition; the tin oxide must be present in an amount equal to from about 1 to 3.5 mole percent, and from about 1 to 2½ mole percent of the bismuth salt and from about 1 to 10 mole percent of the calcium salt must be used to produce the desired ceramic composition.

The following examples are given by way of illustration and should not be considered limitative.

Example 1

| Ingredients: | Mole percent |
|---|---|
| Barium titanate | 93.35 |
| Calcium titanate | 2.37 |
| Bismuth stannate | 1.43 |
| Tin oxide | 2.85 |

Example 2

| Ingredients: | |
|---|---|
| Barium titanate | 90.0 |
| Calcium titanate | 5.0 |
| Bismuth stannate | 2.5 |
| Tin oxide | 2.5 |

Compositions prepared with the above proportions were mixed and ground in a ball mill with a suitable binder such as polymethyl methacrylate resin together with suitable solvents such as ethylene dichloride and the like. They were then cast in the form of thin sheets upon a glass plate, dried at about 70° C., and placed in a furnace where they were fired at a temperature of between about 2000° F. and 2600° F. for less than three hours at top temperature to form the final ceramics. The prepared ceramics were then fashioned into capacitors and tested for dielectric constant, the figures obtained by testing the ceramic of Example 1 being set forth as illustrative of the group: at —55° C. (1740); at 25° C. (1850); at 125° C. (1890); at 150° C. (1910).

As is evidenced by the above figures, the dielectric constant of compositions of the present invention improves generally as the temperature is increased from room temperature up to 150° C. However, even more important is the fact that the dielectric constants of the present compositions do not vary more than 15 percent when the temperature is lowered from 25° C. to —55° C. or when the temperature is increased from 25° C. to 150° C. Such stability renders these compositions exceptional for use in electrical components which are exposed to alternating conditions of heat and cold.

To demonstrate the long life or extended period of reliable performance of the present compositions, the capacitor fashioned from the ceramic of Example 1 was vigorously tested for 1000 hours under the extreme conditions of being subjected to 100 volts per mil thickness of the capacitor at 150° C. Even under these extreme conditions the decrease in the dielectric constant, for instance at room temperature, was only about 5½ percent and the values of the dielectric constant over the temperature range of —55° C. to 150° C. were maintained remarkably high and stable as indicated as follows: at —55° C. (1700); at 25° C. (1746); at 125° C. (1661); at 150° C. (1450).

Next the compositions of Examples 1 and 2, in their cast and fired form, were tested for voltage breakdown or dielectric strength. Cast slips, 5 mils in thickness, were subjected to increasing voltage passed therethrough with the results that slips of each of the compositions endured over 800 volts per mil and greater before failure, thus indicating dielectric strengths nearly twice as great and greater than those of prior-known barium titanate compositions.

The barium titanate ceramic powder used according to the present invention is preferably one of commercial grade such as Ticon B. The chemical analysis of this material discloses the following materials present in the indiciated percentages: BaO—63.70%, $TiO_2$—33.21%, $ZrO_2$—0.01%, CaO—0.05%, CuO—0.003%, MgO—0.02%, SrO—0.29%, SiO—0.35%, $Al_2O_3$—0.35%, $Fe_2O_3$—0.02%, $K_2O$—0.05%, $Na_2O$—0.20%, $P_2O_5$—0.14%, $SO_2$—0.43% and $CO_2$—0.79%, with a 1.33% ignition loss.

Various additives may be incorporated into the novel ceramic compositions of the present invention without departing from the scope thereof. For instance, the aging characteristics are improved by the incorporation of from about 0.5 to 2 percent by weight of an oxide such as tantalum oxide, niobium pentoxide or preferably uranium oxide. It has been found that uranium oxide increases the life of the ceramic under load, reduces the D.C. voltage coefficient and reduces the dissipation factor at 1 kc. with applied A.C. voltage. Likewise clay may be added in an amount equal to about 1 percent by weight in order to improve the adherence of silver paint which usually contains a small amount of a bismuth lead borosilicate glass.

Variations and modifications may be made within the scope of the claims and portions of the improvements may be used without others.

I claim:

1. The method of preparing a barium titanate ceramic having a high dielectric strength, a voltage breakdown of at least 750 volts per mil and a high dielectric constant which varies by not more than 15 percent when the temperature is lowered from 25° C. to —55° C. and raised from 25° to 150° C. which comprises mixing from 85 to 96 mole percent of barium titanate, from 1 to 3.5 mole percent of tin oxide, 1 to 2½ mole percent of bismuth stannate and from 1 to 10 mole percent of calcium titanate, depositing said mixture in the form of a thin layer upon a suitable support and firing said layer at a temperature of between about 2000° F. to 2600° F. for a period of time sufficient to form said ceramic.

2. The method of preparing a barium titanate ceramic having a high dielectric strength, a voltage breakdown of at least 750 volts per mil and a high dielectric constant which shows very little variation over an extended temperature range, which comprises mixing about 93.4 mole percent barium titanate, about 2.8 mole percent of tin oxide, about 2.4 mole percent of calcium titanate and about 1.4 mole percent of bismuth stannate, depositing said mixture in the form of a thin layer upon a suitable support and firing said layer at a temperature of between about 2000° F. to 2600° F. for a period of time sufficient to form said ceramic.

3. A ceramic dielectric composition having a high dielectric strength, a voltage breakdown of at least 750 volts per mil and a high dielectric constant which varies by not more than 15 percent when the temperature is lowered from 25° C. to —55° C. and raised from 25° C. to 150° C., comprising 85 to 96 mole percent barium titanate, 1 to 3.5 mole percent tin oxide, 1 to 2½ mole percent of bismuth stannate and from 1 to 10 mole percent of calcium titanate.

4. A ceramic dielectric composition having a high dielectric strength, a voltage breakdown of at least 750 volts per mil and a high dielectric constant which varies by not more than 15 percent when the temperature is lowered from 25° C. to —55° C. and raised from 25° C. to 150° C., comprising about 93.35 mole percent barium titanate, about 2.85 mole percent tin oxide, about 2.37 mole percent calcium titanate and about 1.43 mole percent bismuth stannate.

5. A ceramic dielectric composition according to claim 3 in which the barium titanate used is commercial grade barium titanate.

References Cited in the file of this patent

UNITED STATES PATENTS

| 2,108,544 | Meyer | Feb. 15, 1938 |
| 2,170,683 | Friederich et al. | Aug. 22, 1939 |
| 2,908,579 | Nelson et al. | Oct. 13, 1959 |
| 2,922,730 | Feldman | Jan. 26, 1960 |
| 2,992,929 | Clement et al. | July 18, 1961 |

FOREIGN PATENTS

| 755,860 | Great Britain | Aug. 29, 1956 |

OTHER REFERENCES

Bradley: "What About the Rare Earths," Ceramic Age, October 1957, pages 29–31.

UNITED STATES PATENT OFFICE
CERTIFICATE OF CORRECTION

Patent No. 3,068,107                  December 11, 1962

Solomon Levinson

It is hereby certified that error appears in the above numbered patent requiring correction and that the said Letters Patent should read as corrected below.

Column 2, Example 2, above the right-hand column, insert the heading "Mole percent"; column 3, line 3, for "indiciated" read -- indicated --; line 5, for "SiO" read -- $SiO_2$ --; line 32, for "25° to 150° C." read -- 25° C. to 150° C., --; same column 3, lines 43 and 44, for "shows very little variation over an extended temperature range" read -- varies by not more than 15 percent when the temperature is lowered from 25° C. to -55° C. and raised from 25° C. to 150° C. --.

Signed and sealed this 9th day of April 1963.

(SEAL)
Attest:

ESTON G. JOHNSON                            DAVID L. LADD
Attesting Officer                               Commissioner of Patents